(12) United States Patent
Matsunaga

(10) Patent No.: US 9,167,133 B2
(45) Date of Patent: Oct. 20, 2015

(54) IMAGE CAPTURING APPARATUS AND IMAGE PROCESSING METHOD

(71) Applicant: Olympus Corporation, Shibuya-ku, Tokyo (JP)

(72) Inventor: Takuya Matsunaga, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/336,730

(22) Filed: Jul. 21, 2014

(65) Prior Publication Data

US 2015/0022691 A1    Jan. 22, 2015

(30) Foreign Application Priority Data

Jul. 22, 2013   (JP) ................. 2013-151927

(51) Int. Cl.
    *H04N 5/217*    (2011.01)
    *H04N 5/243*    (2006.01)
    *H04N 5/232*    (2006.01)
    *H04N 5/369*    (2011.01)

(52) U.S. Cl.
    CPC ......... *H04N 5/2176* (2013.01); *H04N 5/23212* (2013.01); *H04N 5/243* (2013.01); *H04N 5/3696* (2013.01)

(58) Field of Classification Search
    CPC .... H04N 5/2176; H04N 5/243; H04N 5/3696
    See application file for complete search history.

(56) References Cited

U.S. PATENT DOCUMENTS

2012/0121203 A1*   5/2012   Hara ........................ 382/255

FOREIGN PATENT DOCUMENTS

JP          3592147      11/2004
JP     2010-062640      3/2010

* cited by examiner

*Primary Examiner* — Paul Berardesca
(74) *Attorney, Agent, or Firm* — John C. Pokotylo; Straub & Pokotylo

(57) ABSTRACT

An image capturing apparatus includes an image capturing unit and an image processing unit. The image capturing unit captures a subject by an image sensor including focus detection pixels. The image processing unit includes a correction range determination unit configured to determine a range of a correction coefficient based on an optical condition of a photographing optical system, and a correction coefficient calculation unit configured to calculate the correction coefficient based on pixel data of a pixel positioned near the focus detection pixel, and a pixel correction unit configured to correct the pixel data of the focus detection pixel based on the correction coefficient and the range.

20 Claims, 8 Drawing Sheets

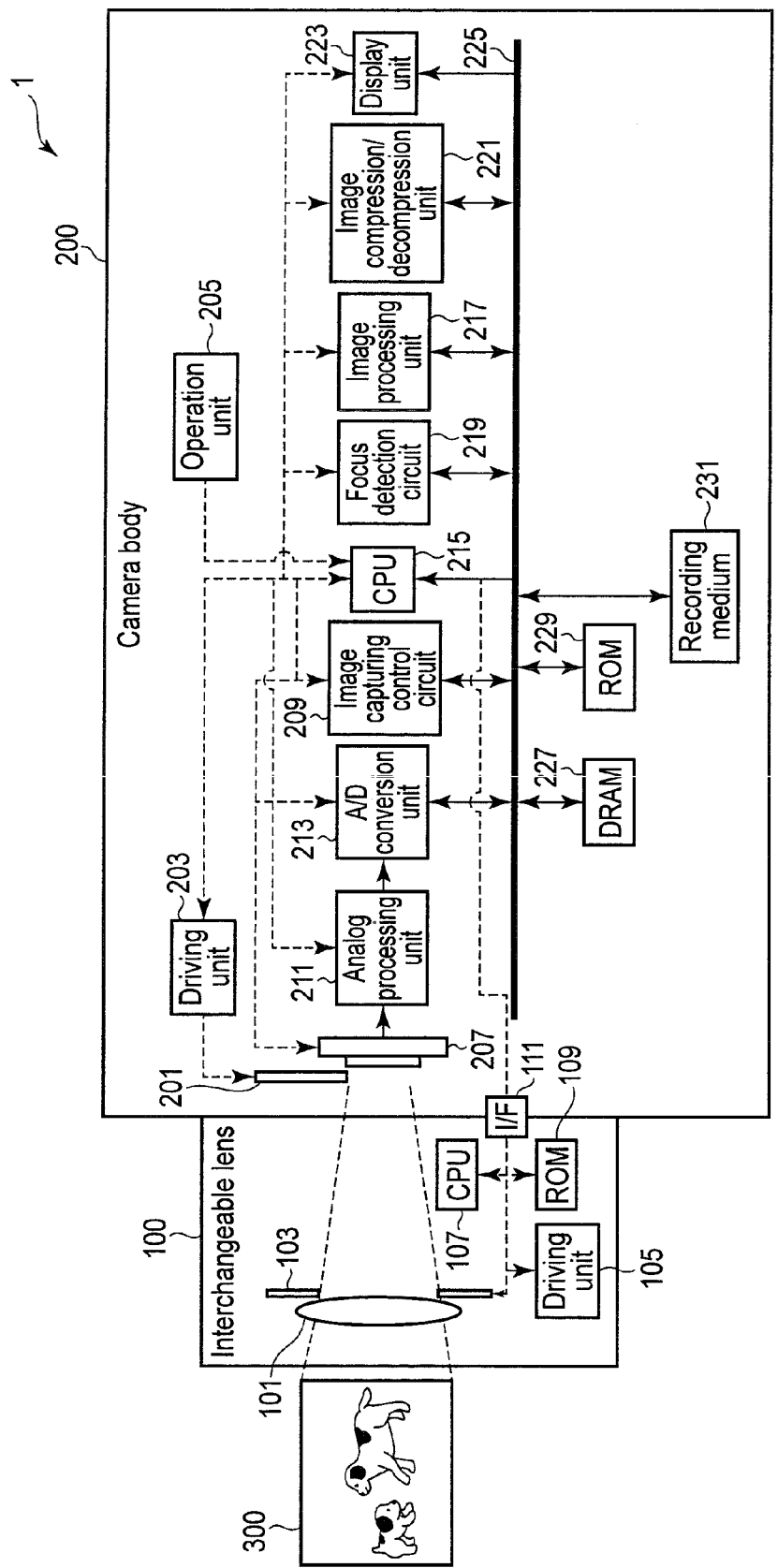
F I G. 1

FIG. 2

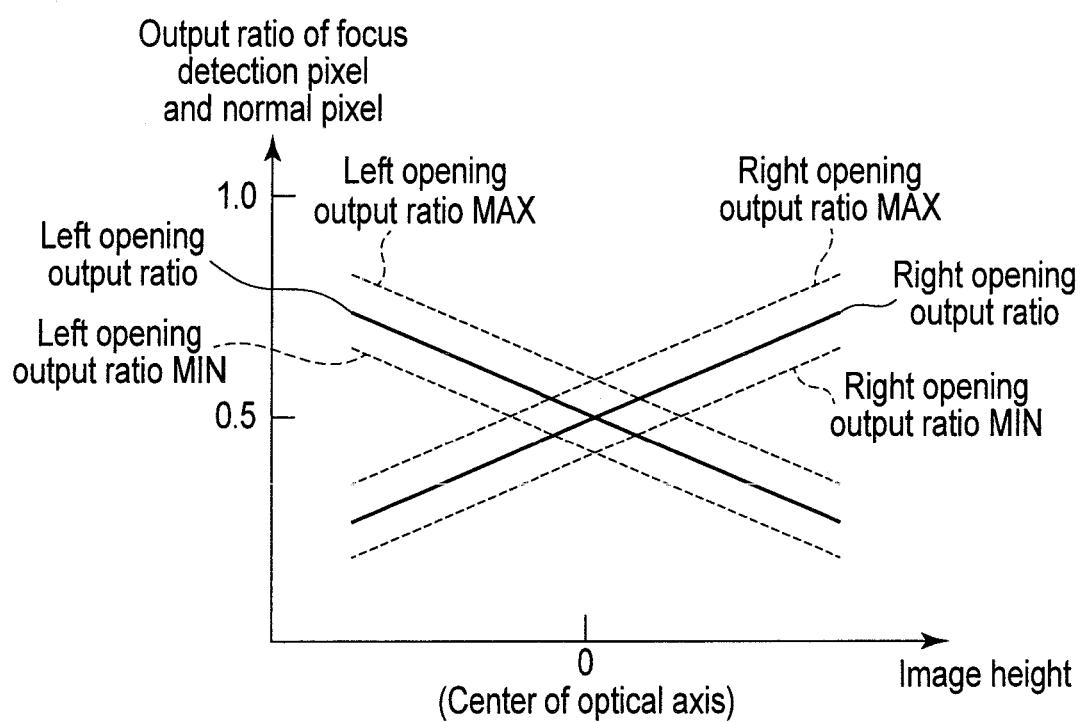
F I G. 5

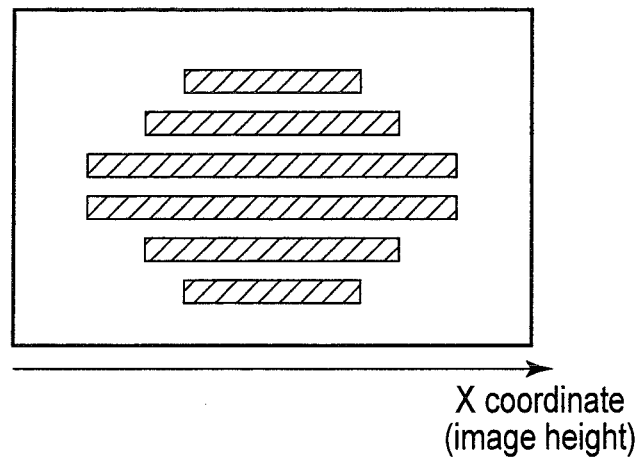
F I G. 6A
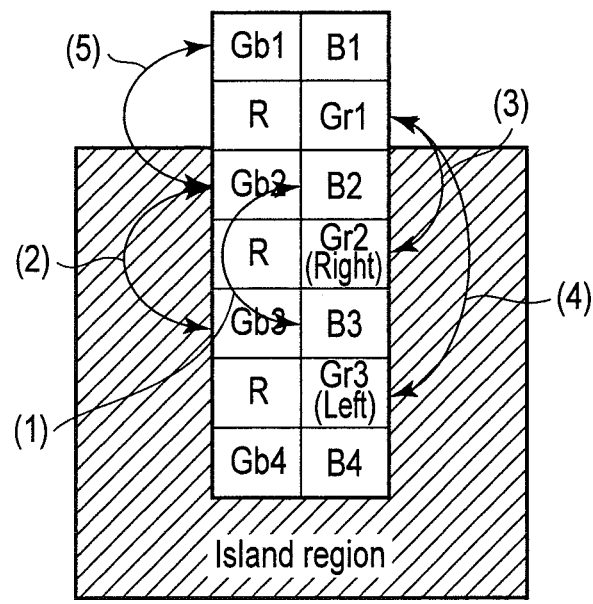
F I G. 6B

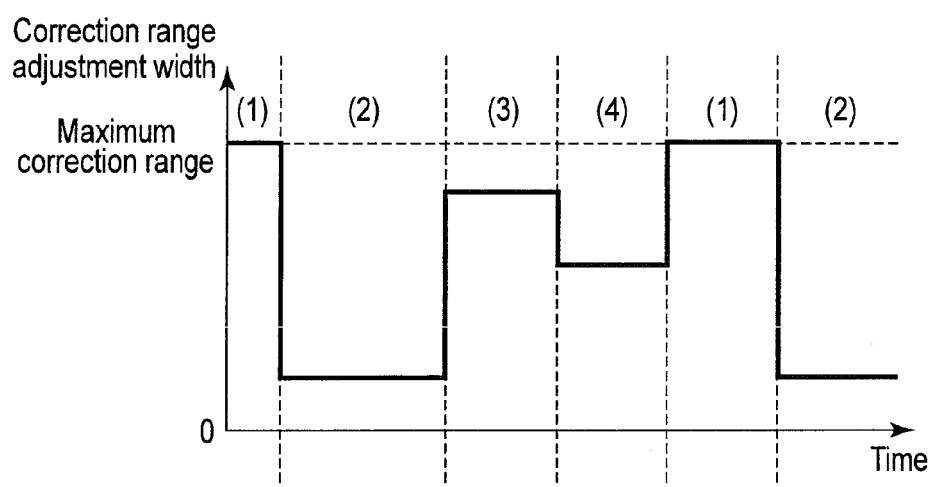
F I G. 8

IMAGE CAPTURING APPARATUS AND IMAGE PROCESSING METHOD

CROSS-REFERENCE TO RELATED APPLICATIONS

This application is based upon and claims the benefit of priority from the prior Japanese Patent Application No. 2013-151927, filed Jul. 22, 2013, the entire contents of which are incorporated herein by reference.

BACKGROUND OF THE INVENTION

1. Field of the Invention

The present invention relates to an image capturing apparatus and image processing method for processing a pixel output from an image sensor which detects a focus state by using some pixels as phase difference focus detection elements.

2. Description of the Related Art

For example, Japanese Patent No. 3592147 has proposed an image capturing apparatus which detects a focus state by using some pixels of an image sensor as focus detection elements. In the image capturing apparatus disclosed in Japanese Patent No. 3592147, some pixels of an image sensor are set as focus detection pixels. Subject beams having passed through different pupil regions symmetrical with respect to the center of the optical axis of a photographing lens are formed into images on a plurality of focus detection pixels. The phase difference between these subject beams is detected to detect the focus state of the photographing lens.

A partial region of the focus detection pixel is shielded from light. Hence, a pixel output from the focus detection pixel is a pixel output of attenuated light in comparison with a normal pixel. It is known that the light attenuation amount in the focus detection pixel changes depending on optical characteristics regarding the focus detection pixel. In an image capturing apparatus disclosed in Jpn. Pat. Appln. KOKAI Publication No. 2010-62640, a pixel output from a focus detection pixel is corrected by gain adjustment, or corrected by using pixel outputs from pixels around a focus detection pixel.

BRIEF SUMMARY OF THE INVENTION

According to a first aspect of the invention, an image capturing apparatus comprises: an image capturing unit configured to capture a subject by an image sensor in which focus detection pixels for performing focus detection are arranged at positions of some image capturing pixels, and output image capturing data; and an image processing unit configured to correct, by a correction coefficient, pixel data output from the focus detection pixels, out of the image capturing data. The image processing unit includes: a correction range determination unit configured to determine, as a correction range, a range of the correction coefficient based on an optical condition of a photographing optical system configured to form an image on the image sensor; a correction coefficient calculation unit configured to calculate the correction coefficient based on pixel data of a pixel positioned near the focus detection pixel; and a pixel correction unit configured to correct the pixel data of the focus detection pixel based on the correction coefficient and the correction range.

According to a second aspect of the invention, an image processing method of correcting, by a correction coefficient, pixel data output from focus detection pixels, out of image capturing data obtained by an image sensor in which the focus detection pixels for performing focus detection are arranged at positions of some image capturing pixels comprises: determining, as a correction range, a range of the correction coefficient based on an optical condition of a photographing optical system configured to form an image on the image sensor; calculating the correction coefficient based on pixel data output from a pixel positioned near the focus detection pixel; and correcting the pixel data of the focus detection pixel based on the correction coefficient and the correction range.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the arrangement of a digital camera as an example of an image capturing apparatus according to an embodiment of the present invention;

FIG. 2 is a view showing an example of the pixel array of an image sensor;

FIG. 5 is a view for explaining the correction range;

FIG. 6A is a first view for explaining an example of a correction coefficient calculation method;

FIG. 6B is a second view for explaining the example of the correction coefficient calculation method;

FIG. 8 is a view showing an example of adjustment of the correction range when optical conditions change temporally.

DETAILED DESCRIPTION OF THE INVENTION

Figure 3:
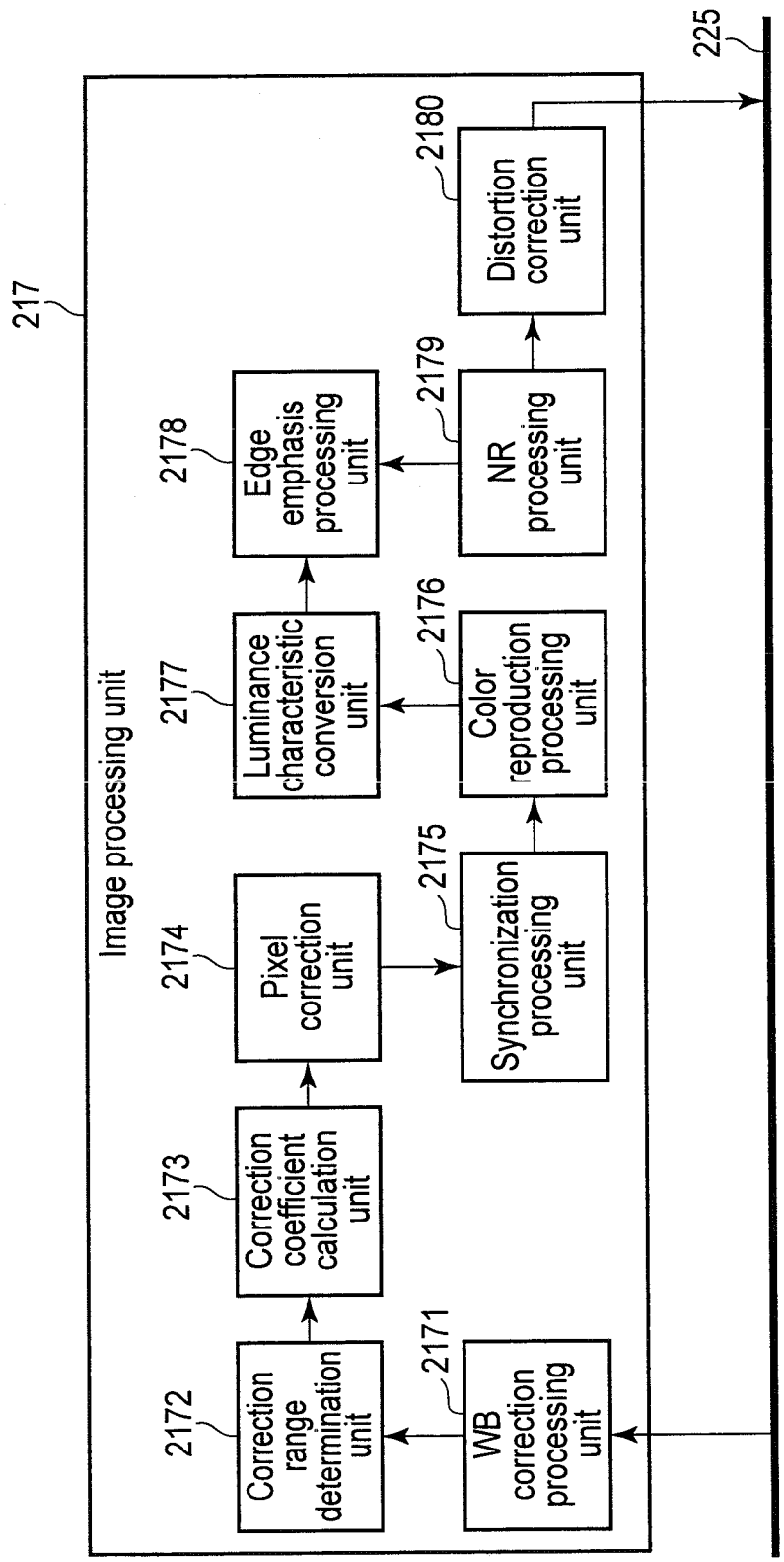
FIG. 3 is a block diagram showing the detailed arrangement of an image processing unit.

An embodiment of the present invention will now be described with reference to the accompanying drawings.

FIG. 1 is a block diagram showing the arrangement of a digital camera (to be simply referred to as a camera hereinafter) as an example of an image capturing apparatus according to an embodiment of the present invention. In FIG. 1, solid arrow lines indicate the flows of data, and broken arrow lines indicate the flows of control signals. The camera in FIG. 1 exemplifies a lens-interchangeable camera. However, the camera according to the embodiment is not always a lens-interchangeable camera.

A camera 1 shown in FIG. 1 includes an interchangeable lens 100 and camera body 200. The interchangeable lens 100 is configured to be detachable from the camera body 200. When the interchangeable lens 100 is mounted on the camera body 200, it operates under the control of the camera body 200.

The interchangeable lens 100 includes a photographing lens 101, diaphragm 103, driving unit 105, CPU (Central Processing Unit) 107, ROM 109, and interface (I/F) 111.

The photographing lens 101 is a photographing optical system for forming the image of a subject 300 on an image sensor 207. The photographing lens 101 may include a focus lens for adjusting an in-focus position, or may be configured as a zoom lens. The diaphragm 103 is arranged on the optical axis of the photographing lens 101, and configured to have a variable aperture. The diaphragm 103 restricts the amount of a beam which has traveled from the subject 300 and passed through the photographing lens 101. The driving unit 105 drives the photographing lens 101 and the diaphragm 103 based on control signals from the CPU 107.

The CPU 107 performs control of the driving unit 105 and the like under the control of the CPU 215 of the camera body 200. The ROM 109 stores optical information of the photographing lens 101. If necessary, the CPU 107 reads out optical information of the photographing lens 101 from the ROM 109, and transmits the readout optical information to the CPU 215 of the camera body 200 via the I/F 111. The optical information of the photographing lens 101 that is stored in the ROM 109 includes, e.g., information representing the type of the photographing lens 101, and distortion information of the photographing lens 101.

The camera body 200 includes a mechanical shutter 201, a driving unit 203, an operation unit 205, the image sensor 207, an image capturing control circuit 209, an analog processing unit 211, an analog-to-digital (A/D) conversion unit 213, a CPU 215, an image processing unit 217, a focus detection circuit 219, an image compression/decompression unit 221, a display unit 223, a bus 225, a DRAM (Dynamic Random Access Memory) 227, a ROM (Read Only Memory) 229, and a recording medium 231.

The mechanical shutter 201 is configured to be freely openable and closable. The mechanical shutter 201 adjusts the incident time (exposure time of the image sensor 207) of a subject beam traveling from the subject 300 to the image sensor 207. As the mechanical shutter 201, a known focal plane shutter, lens shutter, or the like can be employed. The driving unit 203 controls opening/closing of the mechanical shutter 201 based on a control signal from the CPU 215.

The operation unit 205 includes various operation buttons such as a power button, release button, movie button, playback button, and menu button, and various operation members such as a touch panel. The operation unit 205 detects the operation states of various operation members, and outputs, to the CPU 215, signals representing the detection results. The operation unit 205 according to the embodiment can be used to select the shooting mode of the camera 1. The user can operate the operation unit 205 to select the shooting mode of the camera 1 from a still image shooting mode and moving image shooting mode. The still image shooting mode is a shooting mode for shooting a still image. The moving image shooting mode is a shooting mode for shooting a moving image.

The image sensor 207 is arranged at a position on the optical axis of the photographing lens 101 and behind the mechanical shutter 201, at which a subject beam is formed into an image through the photographing lens 101. The image sensor 207 is configured by two-dimensionally arranging photodiodes constituting pixels. The image sensor 207 according to the embodiment includes image capturing pixels for acquiring an image for recording or display, and focus detection pixels for focus detection.

The photodiodes constituting the image sensor 207 generate charges in accordance with the light reception amount. The charges generated in the photodiodes are accumulated in capacitors connected to the respective photodiodes. The charges accumulated in the capacitors are read out as image signals. The image sensor 207 according to the embodiment adopts a plurality of different charge readout methods. The charges accumulated in the image sensor 207 are read out in accordance with a control signal from the image capturing control circuit 209.

For example, color filters of a Bayer array are arranged on the front surfaces of the photodiodes constituting the pixels. The Bayer array has lines on each of which R pixels and G (Gr) pixels are alternately arranged in the horizontal direction and lines on each of which G (Gb) pixels and B pixels are alternately arranged.

The image capturing control circuit 209 sets a readout method of the image sensor 207 in accordance with a control signal from the CPU 215 and controls readout of an image signal from the image sensor 207 in accordance with the set readout method. The readout method of a pixel output (pixel data) from the image sensor 207 is set in accordance with the operation state of the camera 1. For example, when pixel data needs to be read out in real time from the image sensor 207 (e.g., in live view display or moving image recording), pixel data from a plurality of pixels of the same color are mixed and read out, or pixel data of specific pixels are thinned out to read out pixel data, so as to implement quick readout of pixel data. To the contrary, when the image quality is more important than real-time processing (e.g., in still image recording), pixel data of all pixels are read out to maintain the resolution without performing mixing readout or thinning-out reading.

The analog processing unit 211 performs analog processing on an image signal read out from the image sensor 207 under the control of the image capturing control circuit 209. This analog processing includes correlated double sampling processing and gain adjustment processing.

The A/D conversion unit 213 functioning as an image capturing unit together with the image sensor 207, image capturing control circuit 209, and analog processing unit 211 is an analog-to-digital converter. The A/D conversion unit 213 converts, into a digital image signal (pixel data), an image signal having undergone analog processing by the analog processing unit 211. In this specification, a set of a plurality of pixel data will be described as image capturing data.

The CPU 215 controls the overall camera 1 according to a program stored in the ROM 229. The CPU 215 is connected to the CPU 107 of the interchangeable lens 100 via the I/F 111 to freely communicate with it. The CPU 215 inputs a control signal to the CPU 107 to control the interchangeable lens 100.

The image processing unit 217 performs various image processes on image capturing data to generate image data. For example, when recording a still image, the image processing unit 217 performs image processing for still image recording to generate still image data. Similarly, when recording a moving image, the image processing unit 217 performs image processing for moving image recording to generate moving image data. In live view display, the image processing unit 217 performs image processing for display to generate display image data. The detailed arrangement of the image processing unit 217 will be described later.

The focus detection circuit 219 acquires pixel data from focus detection pixels and calculates the defocus direction and defocus amount of the photographing lens 101 with respect to the in-focus position based on the acquired pixel data by using a known phase difference method.

When recording image data, the image compression/decompression unit 221 compresses image data (still image data or moving image data) having undergone image processing by the image processing unit 217. When playing back image data, the image compression/decompression unit 221 decompresses compressed image data.

The display unit 223 is a display unit such as a liquid crystal display or organic EL display, and is arranged on, e.g., the rear surface of the camera 1. The display unit 223 displays an image in accordance with display image data. The display unit 223 is used for live view display, display of a recorded image, and the like.

The bus 225 is connected to the A/D conversion unit 213, CPU 215, image processing unit 217, focus detection circuit 219, DRAM 227, ROM 229, and recording medium 231. The bus 225 functions as a transfer path for transferring various data generated in these blocks.

The DRAM 227 is an electrically rewritable memory, and temporarily stores various data such as the above-mentioned image capturing data (pixel data), recording image data, display image data, and processing data in the CPU 215. An SDRAM (Synchronous Dynamic Random Access Memory) may be used for temporal storage. The ROM 229 is a nonvolatile memory such as a mask ROM or flash memory. The ROM 229 stores various data such as programs to be used by the CPU 215 and the adjustment values of the camera 1. The ROM 229 according to the embodiment stores information of a correction range used for pixel correction processing in the image processing unit 217. The correction range will be explained in detail later. The recording medium 231 is configured to be incorporated or loaded in the camera 1, and records recording image data as an image file of a predetermined format.

Figure 2:
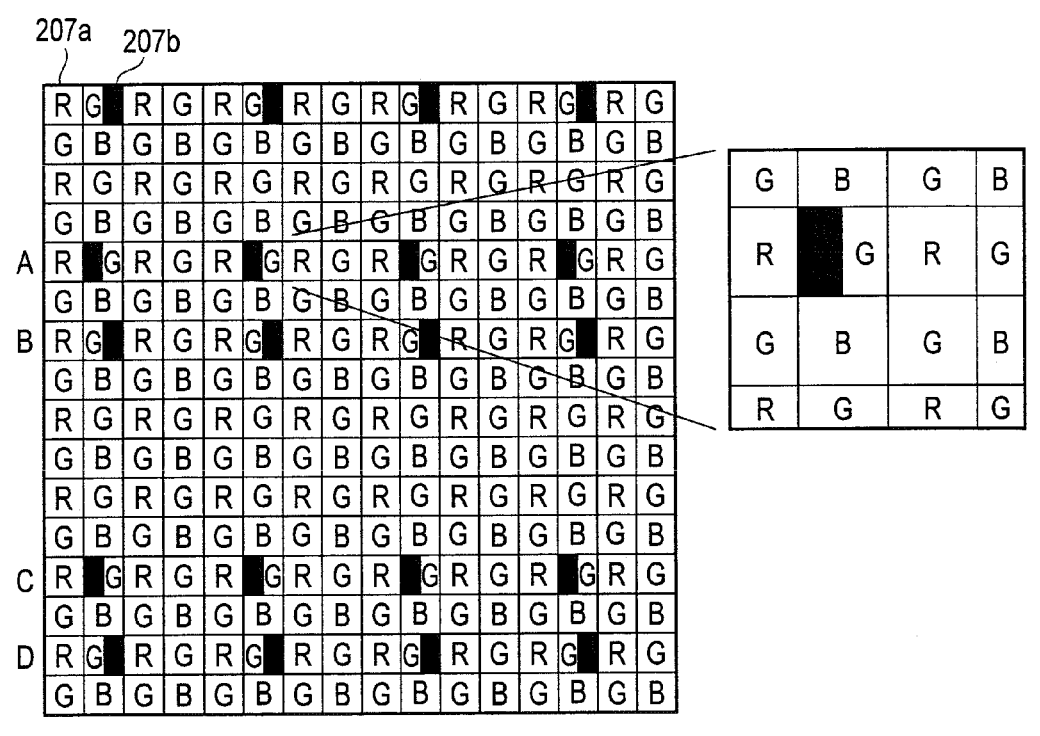

The arrangement of the image sensor 207 will be explained with reference to FIG. 2. FIG. 2 is a view showing an example of the pixel array of the image sensor 207. Some pixels are enlarged and shown on the right side in FIG. 2. Although FIG. 2 shows an example of the Bayer array, the array of color filters is not limited to the Bayer array, and various arrays are applicable.

As described above, the image sensor 207 of the Bayer array includes pixel lines on each of which R pixels and G (Gr) pixels are alternately arranged in the horizontal direction and pixel lines on each of which G (Gb) pixels and B pixels are alternately arranged. In other words, a set of four pixels, that is, a Gr pixel, R pixel, Gb pixel, and B pixel shown in the enlarged view on the right side is repetitively arranged in the horizontal and vertical directions.

In the embodiment, focus detection pixels 207b are arranged at the positions of some image capturing pixels 207a. The focus detection pixel is a pixel in which a light-shielding film shields, e.g., the left or right region from light. In the example of FIG. 2, a line of focus detection pixels in which the left half surface is shielded from light (to be referred to as right-opening focus detection pixels hereinafter) and a line of focus detection pixels in which the right half surface is shielded from light (to be referred to as left-opening focus detection pixels hereinafter) are arranged to be close in the vertical direction.

In an image sensor having a large number of pixels, the area of each pixel decreases, and it is considered that almost the same image is formed on pixels arranged close together. Therefore, by arranging focus detection pixels as shown in FIG. 2, the phase difference can be detected by a pair of a focus detection pixel on line A and a focus detection pixel on line B in FIG. 2. Also, the phase difference can be detected by a pair of a focus detection pixel on line C and a focus detection pixel on line D.

In the example of FIG. 2, the light-shielded region in the focus detection pixel is either the left or right region. In this case, a horizontal phase difference can be detected. However, by setting either an upper or lower region or an oblique region as the light-shielded region, a vertical phase difference or oblique phase difference can also be detected. The light-shielding area may not be ½ of the pixel region as long as the region has sufficient area. Further, focus detection pixels are arranged in G pixels in FIG. 2, but may be arranged in R or B pixels other than G pixels. In the example of FIG. 2, the pupil is divided by shielding the partial region of the focus detection pixel from light. However, it suffices if the focus detection pixel selectively receives one of paired subject beams having passed through different pupil regions of the photographing lens 101. Therefore, the pupil may be divided by, e.g., pupil division microlenses, instead of shielding the partial regions from light. Furthermore, FIG. 2 shows an example in which focus detection pixels are arranged in the cycle of four pixels in the horizontal direction. However, the cycle in which focus detection pixels are arranged is not limited to a specific cycle.

Since the partial region of the focus detection pixel is shielded from light, the light amount decreases. The decrease in light amount also changes according to the position of the light-shielding film, the angle of light incident on the focus detection pixel, and the image height, in addition to the area of the light-shielding film formed in the focus detection pixel. Such a decrease in light amount is corrected by the image processing unit 217.

FIG. 3 is a block diagram showing the detailed arrangement of the image processing unit 217. In FIG. 3, the blocks other than the image processing unit 217 are not illustrated. The image processing unit 217 includes a white balance (WB) correction processing unit 2171, correction range determination unit 2172, correction coefficient calculation unit 2173, pixel correction unit 2174, synchronization processing unit 2175, color reproduction processing unit 2176, luminance characteristic conversion unit 2177, edge emphasis processing unit 2178, noise reduction (NR) processing unit 2179, and distortion correction unit 2180.

The WB correction processing unit 2171 performs white balance correction processing to correct the color balance of an image by amplifying each color component of image capturing data by a predetermined gain amount.

The correction range determination unit 2172 determines, as the correction range, the range of correction coefficients applied to correct a pixel output from the focus detection pixel by the pixel correction unit 2174. The correction coefficient calculation unit 2173 calculates a correction coefficient for correcting a pixel output from the focus detection pixel. The correction coefficient is calculated based on, e.g., a function which associates the coordinates (image height) of the focus detection pixel with a pixel output from the focus detection pixel using a pixel output from the image capturing pixel as the reference. The pixel correction unit 2174 corrects a pixel output from the focus detection pixel in accordance with the correction coefficient calculated by the correction coefficient calculation unit 2173. Details of the correction range determination unit 2172, correction coefficient calculation unit 2173, and pixel correction unit 2174 will be described later.

The synchronization processing unit 2175 converts image capturing data in which one pixel corresponds to one color component, such as image capturing data output via the image sensor 207 in correspondence with the Bayer array, into image data in which one pixel corresponds to a plurality of color components. The color reproduction processing unit 2176 performs various processes for obtaining appropriate color reproduction of image data. This processing is, e.g., color matrix calculation processing. The color matrix calculation processing is processing of multiplying image data by a color matrix coefficient complying with, e.g., the white balance mode. In addition, the color reproduction processing unit 2176 corrects the saturation and hue. The luminance characteristic conversion unit 2177 converts the luminance characteristic (gamma characteristic) of image data so as to be fit for display and recording. The edge emphasis processing unit 2178 multiplies, by an edge emphasis coefficient, an edge signal extracted from image data using a bandpass filter or the like, and adds the result to the original image data to emphasize the edge (contour) component in the image data. The NR processing unit 2179 removes a noise component in image data by using coring processing or the like. The distortion correction unit 2180 corrects a distortion in image data. For example, the distortion correction unit 2180 corrects a distortion in image data by converting the coordinates of image data before distortion correction in accordance with a predetermined function for correcting a distortion.

Figure 4:
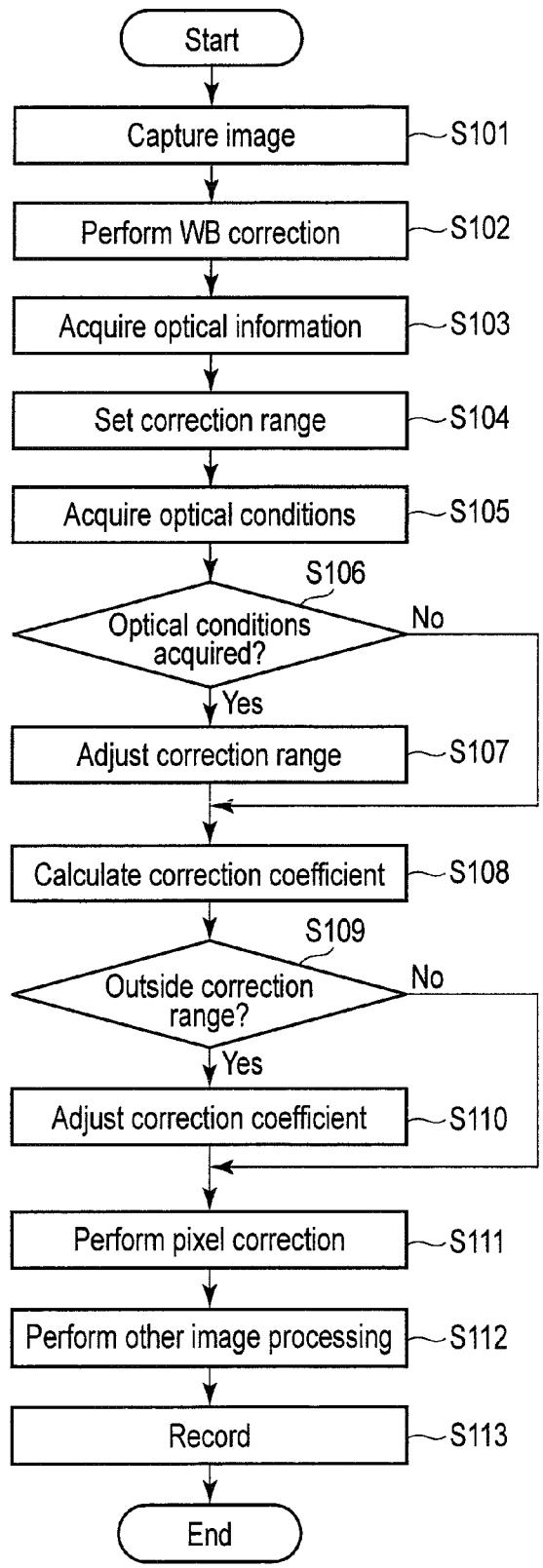
FIG. 4 is a flowchart showing processing in a still image shooting operation.

The operation of the image capturing apparatus according to the embodiment will be explained. FIG. 4 is a flowchart showing processing of a pixel correction operation in still image shooting by the image capturing apparatus. When the user designates execution of still image shooting, the CPU 215 executes image capturing (exposure) by the image sensor 207 for still image shooting (step S101). An image signal obtained by image capturing is read out from the image sensor 207 in accordance with a preset readout method. The readout image signal undergoes analog processing by the analog processing unit 211, is digitized by the A/D conversion unit 213, and temporarily stored as image capturing data in the DRAM 227. After image capturing, the CPU 215 controls the image processing unit 217 to execute image processing. At this time, the WB correction processing unit 2171 of the image processing unit 217 reads out the image capturing data from the DRAM 227 and performs white balance correction processing (step S102).

Subsequently, the correction range determination unit 2172 acquires optical information (step S103). After acquiring the optical information, the correction range determination unit 2172 sets a correction range (step S104). FIG. 5 is a view showing an example of the correction range. The correction range is defined by the maximum and minimum values of the correction coefficient which can change upon a change of the optical conditions of the interchangeable lens 100. The correction coefficient according to the embodiment is the ratio of a pixel output from the focus detection pixel and a pixel output from the normal image capturing pixel (i.e., the amount of a decrease in light amount in the focus detection pixel), details of which will be described later. The ratio of pixel outputs also changes according to the position of the light-shielding film, the angle of light incident on the focus detection pixel, and the image height, in addition to the area of the light-shielding film formed in the focus detection pixel. The angle of light incident on the focus detection pixel can change in accordance with the optical conditions (e.g., focal length, focus position, and aperture value). In the embodiment, correction coefficients corresponding to the maximum and minimum values of optical conditions for each interchangeable lens 100 are stored as a correction range in the ROM 229. This makes it possible to determine the reliability of correction coefficients calculated in a method to be described later. If it is determined that the reliability of calculated correction coefficients is low, a correction error in pixel correction processing can be reduced by adjusting the correction coefficients to values within the correction range. As the correction range, both a correction range corresponding to the right-opening focus detection pixel and a correction range corresponding to the left-opening focus detection pixel are stored, as shown in FIG. 5. This is because the change amount of the correction coefficient with respect to the image height differs between the right-opening focus detection pixel and the left-opening focus detection pixel. The memory which stores correction coefficients (correction range) corresponding to the maximum and minimum values of an optical condition is not limited to the ROM on the camera side, and the correction coefficients may be stored in the ROM 109 inside the interchangeable lens 100. In this case, the correction coefficients (correction range) corresponding to the maximum and minimum values of the optical condition may be acquired by communication with the interchangeable lens 100.

After setting the correction range, the correction range determination unit 2172 acquires optical conditions (step S105). The optical conditions are optical information which can change at the time of shooting, such as the focal length, focus position, and aperture value in a shooting operation. Then, the correction range determination unit 2172 determines whether the optical conditions have been acquired (step S106). If the correction range determination unit 2172 determines in step S106 that the optical conditions have not been acquired, it shifts the process to step S108. If the correction range determination unit 2172 determines in step S106 that the optical conditions have been acquired, it adjusts the correction range in accordance with the optical conditions (step S107). This adjustment is performed by adding/subtracting a coefficient corresponding to each optical condition to/from, e.g., a maximum value Max of the correction coefficient and a minimum value Min of the correction coefficient. For example, assume that the correction range set in step S104 is represented as follows:

correction range=A+B+C correction range corresponding to the aperture value: A correction range corresponding to the focal length: B correction range corresponding to the focus position: C For example, when the focal length has been acquired, the correction range B of the focal length is narrowed in accordance with the value of the focal length. For example, letting ΔB be a predetermined correction range adjustment amount, the adjusted correction range is set to B=B−ΔB. This adjustment of the correction range also narrows the entire correction range.

After that, the correction coefficient calculation unit 2173 calculates a correction coefficient (step S108). An example of a pixel function calculation method will be explained with reference to FIGS. 6A and 6B. In general, focus detection pixels are arranged in hatched regions (to be referred to as island regions hereinafter) in FIG. 6A, which are regions where focus detection is necessary. In the description of the pixel function calculation method, n right-opening focus detection pixels and n left-opening focus detection pixels are arranged at the positions of Gr pixels in the island region. As shown in FIG. 6A, the horizontal image height of the image sensor 207 is defined as the x-axis, and the start x-coordinate of the focus detection pixel (island region) in the horizontal image height direction is defined as start_x.

When calculating a correction coefficient, the correction coefficient calculation unit 2173 calculates a ratio Dif_B of pixel outputs from two image capturing pixels B adjacent to a focus detection pixel. For example, for a right-opening focus detection pixel Gr2 shown in FIG. 6B, the ratio of a pixel output B2 from an image capturing pixel B2 and a pixel output B3 from an image capturing pixel B3 is calculated, as indicated by arrow 1. Hence, Dif_B is given by:

$$Dif\_B = B2/B3 \qquad (1)$$

Then, the correction coefficient calculation unit 2173 calculates a ratio Dif_G of pixel outputs from two image capturing pixels Gb which have the same color as that of the focus detection pixel and are close to the focus detection pixel. For example, for the right-opening focus detection pixel Gr2, the ratio of a pixel output Gb2 from an image capturing pixel Gb2 and a pixel output Gb3 from an image capturing pixel Gb3 is calculated, as indicated by arrow 2. Dif_G is therefore given by:

$$Dif\_G = Gb2/Gb3 \quad (2)$$

The correction coefficient calculation unit 2173 calculates the ratio of a pixel output from the focus detection pixel and a pixel output from an image capturing pixel Gr which has the same color as that of the focus detection pixel and is close in a direction perpendicular to the phase difference detection direction. For example, for the right-opening focus detection pixel Gr2, the ratio of a pixel output Gr2 from the right-opening focus detection pixel Gr2 and a pixel output Gr1 from an image capturing pixel Gr1 is calculated, as indicated by arrow 3. For a left-opening focus detection pixel Gr3, the ratio of a pixel output Gr3 from the left-opening focus detection pixel Gr3 and the pixel output Gr1 from the image capturing pixel Gr1 is calculated, as indicated by arrow 4. The image capturing pixel Gr1 in the example of FIG. 6B is a pixel outside the island. If all Gr pixels in the island are not focus detection pixels, the ratio of pixel outputs from image capturing pixels Gr in the island may be calculated. Thereafter, the correction coefficient calculation unit 2173 calculates the ratio of a pixel output from an image capturing pixel Gr which has the same color as that of the focus detection pixel and is close in a direction perpendicular to the phase difference detection direction and the difference between pixel outputs from two image capturing pixels Gb close to the image capturing pixel Gr. For example, for the right-opening focus detection pixel Gr2, the ratio of a pixel output from the image capturing pixel Gr1 and the difference between pixel outputs from an image capturing pixel Gb1 and the image capturing pixel Gb2 is calculated, as indicated by arrow 5. The correction coefficient calculation unit 2173 calculates a ratio Dif_pRi between pixel outputs from a focus detection pixel and a neighboring image capturing pixel in consideration of a change of the pattern. Dif_pRi is given by:

$$Dif\_pRi = (Gr2/Gr1) - (Gb1 - Gb2)/Gr1 \quad (3)$$

The first term of equation (3) represents the ratio of pixel outputs from the focus detection pixel and neighboring image capturing pixel, and the second term represents the degree of influence of a change of the pattern.

The correction coefficient calculation unit 2173 calculates a weight coefficient W by using Dif_B and Dif_G. The weight coefficient W is a coefficient which comes close to 1 as each of Dif_B and Dif_G comes close to 1. The weight coefficient W is calculated using, e.g., a Gaussian function, though the weight coefficient W need not always be calculated using the Gaussian function:

$$W = \exp\left(-\frac{(1 - (Dif\_B + Dif\_G)/2)^2}{\sigma}\right) \quad (4)$$

where σ is the standard deviation which is arbitrarily set in, e.g., design. For example, when σ=0.1, the Gaussian function uses a standard deviation of 0.1.

After Dif_pRi and the weight coefficient W are calculated for each focus detection pixel, the correction coefficient calculation unit 2173 calculates a correction coefficient approximation function by using the weight coefficient W and Dif_pRi of each focus detection pixel. For example, the approximation function is represented in the form of a linear function: y=ax+b, where x is the horizontal coordinate, and y is a pixel output from a focus detection pixel using a pixel output from an image capturing pixel as the reference, i.e., y is a correction coefficient. The slope a and intercept b of the linear approximation function are given by, e.g., the least squares method:

$$a[0] = \frac{(n-1)\sum_{i=start\_x}^{n-1}(i \times W) \times (Dif\_pRi \times W) - \sum_{i=start\_x}^{n-1}(i \times W)\sum_{i=start\_x}^{n-1}(i \times W) \times (Dif\_pRi \times W)}{(n-1)\sum_{i=start\_x}^{n-1}(i \times W)^2 - \left\{\sum_{i=start\_x}^{n-1}(i \times W)\right\}^2}$$

$$b[0] = \frac{\sum_{i=start\_x}^{n-1}(i \times W)^2 \sum_{i=start\_x}^{n-1}(Dif\_pRi \times W) - \sum_{i=start\_x}^{n-1}(i \times W) \times (W \times Dif\_pRi)\sum_{i=start\_x}^{n-1}(i \times W)}{(n-1)\sum_{i=start\_x}^{n-1}(i \times W)^2 - \left\{\sum_{i=start\_x}^{n-1}(i \times W)\right\}^2}$$

(5)

In this case, the parenthesized values "0" of a and b in equations (5) indicate that the slope and intercept represented by a and b are directed to a right-opening focus detection pixel. For a left-opening focus detection pixel, the parenthesized values of a and b in equations (5) are set to 1, and each value in equations (5) is replaced with a value regarding the left-opening focus detection pixel. More specifically, the first term of equation (3) is replaced with Gr3/Gr1 which is a ratio corresponding to the left-opening focus detection pixel.

Referring back to the description of FIG. 4, after calculating the correction coefficient, the pixel correction unit 2174 determines whether the calculated correction coefficient falls outside the correction range (step S109). If the pixel correction unit 2174 determines in step S109 that the correction coefficient falls within the correction range, it shifts the process to step S111. In this case, the calculated correction coefficient is used without any change. If the pixel correction unit 2174 determines in step S109 that the correction coefficient falls outside the correction range, it adjusts the correction coefficient (step S110). This adjustment is performed by clipping, to the closest value in the correction range, each correction coefficient calculated for, e.g., every image height, or adjusting each correction coefficient to the median of the correction range.

Subsequently, the pixel correction unit 2174 corrects a pixel output from the focus detection pixel (step S111). The pixel output is corrected by gain correction of multiplying a pixel output from each focus detection pixel by the reciprocal of a correction coefficient corresponding to the horizontal image height of the focus detection pixel. By this pixel output correction, a decrease in light amount in a pixel output from each focus detection pixel is corrected. After the pixel correction, the image processing unit 217 executes image processing subsequent to pixel correction processing (step S112). After the end of the image processing, the CPU 215 controls the image compression/decompression unit 221 to compress image data obtained by the image processing, creates an image file based on recording image data obtained by the compression, and records the created image file on the recording medium 231 (step S113). After that, the CPU 215 ends the processing in FIG. 4.

In FIG. 4, WB correction is performed in step S102 before performing pixel correction (step S111). However, WB correction may be executed in other image processing in step S112 after performing pixel correction. When WB correction is performed after pixel correction, higher-accuracy WB correction can be achieved because WB correction is performed using image data reflecting the result of pixel correction. In the embodiment, focus detection pixels are arranged in G pixels. However, even when focus detection pixels are arranged in R or B pixels, the present invention is similarly applicable. In this case, the WB gain calculation accuracy is further improved by performing WB correction not before pixel correction but after it. This has the effect of enabling higher-accuracy WB correction.

Figure 7:
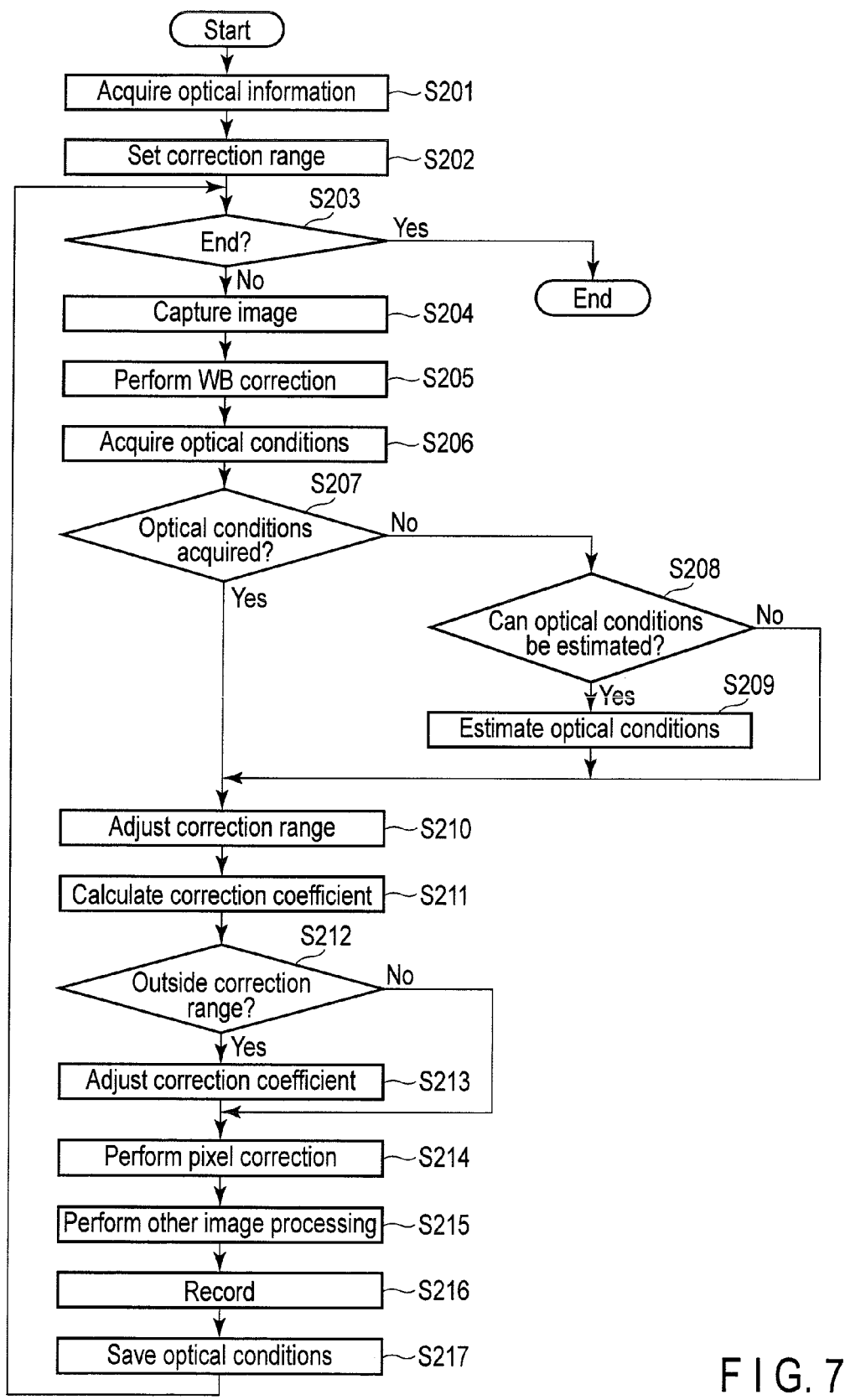
FIG. 7 is a flowchart showing processing in a moving image shooting operation.

FIG. 7 is a flowchart showing processing in moving image shooting by the image capturing apparatus. The CPU 215 and image processing unit 217 execute the processing shown in FIG. 7. The processing according to the flowchart shown in FIG. 7 is also applied to a live view operation. When the user designates execution of moving image shooting, the correction range determination unit 2172 acquires optical information (step S201). After acquiring the optical information, the correction range determination unit 2172 sets a correction range (step S202). The correction range setting method may be the same as that in still image shooting. However, the value of the correction range may differ between still image shooting and moving image shooting. After setting the correction range, the CPU 215 determines whether the end of moving image shooting has been designated (step S203). If the CPU 215 determines in step S203 that the end of moving image shooting has been designated, it ends the processing in FIG. 7.

If the CPU 215 determines in step S203 that the end of moving image shooting has not been designated, it controls the image sensor 207 to perform image capturing (exposure) for moving image shooting (step S204). Similarly to still image shooting, an image signal obtained by image capturing is temporarily stored as image capturing data in the DRAM 227. After image capturing, the CPU 215 controls the image processing unit 217 to execute image processing. At this time, the WB correction processing unit 2171 of the image processing unit 217 reads out the image capturing data from the DRAM 227 and performs white balance correction processing (step S205).

Subsequently, the correction range determination unit 2172 acquires the optical conditions of the current frame (step S206). The correction range determination unit 2172 then determines whether the optical conditions of the current frame have been acquired (step S207). If the correction range determination unit 2172 determines in step S207 that the optical conditions of the current frame have been acquired, it shifts the process to step S210.

If the correction range determination unit 2172 determines in step S207 that the optical conditions of the current frame have not been acquired, it determines whether the optical conditions of the current frame can be estimated (step S208). An optical condition is estimated from, e.g., a change of the optical condition in a plurality of past frames. In step S208, therefore, it is determined whether information necessary to estimate the optical conditions of the current frame have been obtained, i.e., whether reliable optical conditions have been obtained in a plurality of past frames. The reliability of the optical conditions is determined from, e.g., the degree of a change of the optical condition. If an optical condition greatly changes in a short time, it is determined that the reliability is low.

If the correction range determination unit 2172 determines in step S208 that the optical conditions can be estimated, it estimates the optical conditions of the current frame by using the optical conditions of a plurality of past frames (step S209). For example, if the change amount of the focal length in a plurality of past frames is constant, it is also considered that the focal length has changed by the same change amount also in the current frame, and the focal length of the current frame is calculated.

If the optical conditions have been acquired or estimated, the correction range determination unit 2172 adjusts the correction range in accordance with the acquired or estimated optical conditions (step S210). This adjustment may be basically the same as that in still image shooting. However, the optical conditions can change temporally in moving image shooting, so the correction range is adjusted in accordance with a temporal change of the optical conditions.

FIG. 8 is a view showing an example of adjustment of the correction range when optical conditions change temporally. In period (1) of FIG. 8, none of the optical conditions have been acquired or estimated. In this case, the optical conditions in the current frame are unknown, and the correction range is not adjusted, i.e., a maximum correction range corresponding to the interchangeable lens 100 is applied. For example, assuming that the maximum correction range is represented by A+B+C, as described above, this correction range is directly applied to pixel correction processing.

In period (2), all the optical conditions have been acquired. When the optical conditions have been acquired, the correction range is adjusted to be an optimal correction range corresponding to the acquired optical conditions. For example, assuming that the maximum correction range is represented by A+B+C, as described above, the adjusted correction range becomes $(A-\Delta A)+(B-\Delta B)+(C-\Delta C)$. In period (2), the width of the correction range may be set to be 0. In this case, a predetermined correction coefficient is always used for pixel correction processing regardless of the value of the correction coefficient obtained from image capturing data.

In period (3), an optical condition which has been neither acquired nor estimated exists among a plurality of optical conditions. Period (3) is equivalent to, e.g., a period in which only the focal length has not been acquired. In this period, the influence of the optical condition which has not been acquired is unknown. Thus, a maximum correction range is applied based on a combination of an optical condition which has been acquired and an optical condition which has not been acquired. More specifically, an adjustment amount corresponding to the optical condition which has been acquired is set to be a value complying with the optical condition and an adjustment amount corresponding to the optical condition which has not been acquired is set to be 0. Assuming that the maximum correction range is represented by A+B+C, as described above, and the focal length has not been acquired as an optical condition, the adjusted correction range becomes $(A-\Delta A)+B+(C-\Delta C)$. As is apparent from a comparison with (1), the correction range becomes narrower even in period (3) than in period (1) in which none of the optical conditions have been acquired. This reduces a correction error in pixel correction processing.

In period (4), an optical condition which has not been acquired but has been estimated exists among a plurality of optical conditions. In this case, the number of acquired pieces of information is larger than that in period (3), so the correction range can be narrowed, compared to period (3). In FIG. 8, the correction range differs between period (2) and period (4). This is because an adjustment amount corresponding to an optical condition obtained by estimation is set to be smaller than an adjustment amount corresponding to an acquired optical condition. The adjustment amount may be changed in accordance with the reliability of an estimated optical condition.

Thereafter, the correction coefficient calculation unit 2173 calculates a correction coefficient (step S211). The correction coefficient is calculated as in still image shooting. After calculating the correction coefficient, the pixel correction unit 2174 determines whether the calculated correction coefficient falls outside the correction range (step S212). If the pixel correction unit 2174 determines in step S212 that the correction coefficient falls within the correction range, it shifts the process to step S214. In this case, the calculated correction coefficient is used without any change. If the pixel correction unit 2174 determines in step S212 that the correction coefficient falls outside the correction range, it adjusts the correction coefficient (step S213). The correction coefficient is adjusted as in still image shooting.

Subsequently, the pixel correction unit 2174 corrects a pixel output from a focus detection pixel (step S214). The pixel output is corrected as in still image shooting. Then, image processing subsequent to pixel correction processing is executed (step S215). After the end of the image processing, the CPU 215 controls the image compression/decompression unit 221 to compress image data obtained by the image processing, creates an image file based on recording image data obtained by the compression, and records the created image file on the recording medium 231 (step S216). Once the image file is recorded, recording image data is added to the image file until the end of moving image shooting. After recording the image file or adding recording image data, the correction range determination unit 2172 saves the optical conditions of the current frame (step S217). Thereafter, the CPU 215 ends the processing in FIG. 7. The optical conditions saved in step S217 are used for, e.g., estimation of optical conditions in the next and subsequent frames.

In FIG. 7, WB correction is performed in step S205 before performing pixel correction (step S214). Instead, WB correction may be executed in other image processing in step S215 after performing pixel correction. When WB correction is performed after pixel correction, higher-accuracy WB correction can be implemented because WB correction is performed using image data reflecting the result of pixel correction. In the embodiment, focus detection pixels are arranged in G pixels. However, even when focus detection pixels are arranged in R or B pixels, the present invention is similarly applicable. In this case, the WB gain calculation accuracy is further improved by performing WB correction not before pixel correction but after it. This has the effect of enabling higher-accuracy WB correction.

As described above, according to the embodiment, a correction range corresponding to optical conditions is set when a correction coefficient for correcting a pixel output from a focus detection pixel is calculated from image capturing data. The correction coefficient is adjusted to be a correction coefficient complying with optical conditions in a situation in which the correlation between a pixel output from an image capturing pixel and a pixel output from a focus detection pixel is low, and it is determined that the reliability of a correction coefficient calculated from image capturing data is low. Accordingly, a correction error in pixel correction processing is reduced.

By adjusting the correction range upon a change of the optical conditions in moving image shooting or live view, pixel correction processing can be performed in an optimal correction range for each frame.

Each process according to the above-described embodiment can also be stored as a program which can be executed by the CPU 215. In addition, the program can be stored in a storage medium of an external storage device, such as a memory card (e.g., ROM card or RAM card), a magnetic disk (e.g., floppy disk or hard disk), an optical disk (e.g., CD-ROM or DVD), or a semiconductor memory, and distributed. The CPU 215 reads the program stored in the storage medium of the external storage device, and controls an operation according to the read program, thereby executing the above-described processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus comprising:
   an image capturing unit configured to capture a subject by an image sensor in which focus detection pixels for performing focus detection are arranged at positions of some image capturing pixels, and output image capturing data; and
   an image processing unit configured to correct, by a correction coefficient, pixel data output from the focus detection pixels, out of the image capturing data,
   the image processing unit including:
   a correction range determination unit configured to determine, as a correction range, a range of the correction coefficient based on an optical condition of a photographing optical system configured to form an image on the image sensor;
   a correction coefficient calculation unit configured to calculate the correction coefficient based on pixel data of a pixel positioned near the focus detection pixel; and
   a pixel correction unit configured to correct the pixel data of the focus detection pixel based on the correction coefficient and the correction range.

2. The apparatus according to claim 1, wherein the pixel correction unit adjusts the correction coefficient to fall within the correction range when the correction coefficient exceeds the correction range.

3. The apparatus according to claim 1, wherein
   the image sensor performs the image capturing a plurality of times and outputs a plurality of image capturing data, and
   the correction range determination unit acquires a plurality of optical conditions of the photographing optical system that correspond to the respective image capturing data acquired by the image sensor, and determines the correction range based on the plurality of optical conditions corresponding to the plurality of image capturing data.

4. The apparatus according to claim 3, further comprising a storage unit configured to store information about the photographing optical system,
   wherein the correction range determination unit sets a maximum correction range based on the information stored in the storage unit, and determines the correction range based on the plurality of optical conditions and the maximum correction range.

5. The apparatus according to claim 3, wherein the correction range determination unit estimates the optical condition and determines the correction range based on the estimated optical condition, when the optical condition has not been acquired.

6. The apparatus according to claim 5, wherein the correction range determination unit estimates an optical condition used when acquiring current image capturing data, based on a change amount of the optical condition corresponding to a plurality of image capturing data acquired in the past.

7. The apparatus according to claim 1, further comprising a aperture detection unit configured to detect an aperture value of the photographing optical system as the optical condition,
wherein the correction range determination unit determines the correction range in accordance with the aperture value.

8. The apparatus according to claim 1, further comprising a focal length detection unit configured to detect a focal length of the photographing optical system as the optical condition,
wherein the correction range determination unit determines the correction range in accordance with the focal length.

9. The apparatus according to claim 1, further comprising a focus lens position detection unit configured to detect a position of a focus lens of the photographing optical system,
wherein the correction range determination unit determines the correction range in accordance with the position of the focus lens.

10. The apparatus according to claim 1, wherein the correction coefficient calculation unit calculates the correction coefficient based on a ratio of pixel data output from the focus detection pixel and pixel data output from the pixel positioned near the focus detection pixel.

11. An image processing method of correcting, by a correction coefficient, pixel data output from focus detection pixels, out of image capturing data obtained by an image sensor in which the focus detection pixels for performing focus detection are arranged at positions of some image capturing pixels, the image processing method comprising:
determining, as a correction range, a range of the correction coefficient based on an optical condition of a photographing optical system configured to form an image on the image sensor;
calculating the correction coefficient based on pixel data output from a pixel positioned near the focus detection pixel; and
correcting the pixel data of the focus detection pixel based on the correction coefficient and the correction range.

12. The method according to claim 11, wherein the determining the correction range includes, when the correction coefficient exceeds the correction range, adjusting the correction coefficient to fall within the correction range.

13. The method according to claim 11, wherein the determining the correction range includes acquiring optical conditions of the photographing optical system that correspond to respective image capturing operations, and determining the correction range based on the plurality of optical conditions corresponding to respective image capturing data.

14. The method according to claim 13, wherein the determining the correction range further includes:
setting a maximum correction range based on information about the photographing optical system; and
determining the correction range based on the plurality of optical conditions and the maximum correction range.

15. The method according to claim 13, wherein the determining the correction range includes, when the optical condition has not been acquired, estimating the optical condition, and determining the correction Lange based on the estimated optical condition.

16. The method according to claim 15, wherein the estimating the optical condition includes estimating an optical condition used when acquiring current image capturing data, based on a change amount of the optical condition corresponding to a plurality of image capturing data acquired in the past.

17. The method according to claim 11, wherein the determining the correction range includes determining the correction range in accordance with an aperture value of the photographing optical system as the optical condition.

18. The method according to claim 11, wherein the determining the correction range includes determining the correction range in accordance with a focal length of the photographing optical system as the optical condition.

19. The method according to claim 11, wherein the determining the correction range includes determining the correction range in accordance with a position of a focus lens of the photographing optical system as the optical condition.

20. The method according to claim 11, wherein the calculating the correction coefficient includes calculating the correction coefficient based on a ratio of pixel data output from the focus detection pixel, and pixel data output from the pixel positioned near the focus detection pixel.

* * * * *